Feb. 19, 1957 C. Z. ALEXANDER Re. 24,278

STEAM BOILER

Original Filed July 27, 1950

INVENTOR
CARL Z. ALEXANDER
BY Richards & Geier
ATTORNEYS

United States Patent Office

Re. 24,278
Reissued Feb. 19, 1957

24,278

STEAM BOILER

Carl Z. Alexander, Chatham, N. J.

Original No. 2,664,861, dated January 5, 1954, Serial No. 176,235, July 27, 1950. Application for reissue September 28, 1954, Serial No. 459,224

3 Claims. (Cl. 122—165)

Matter enclosed in heavy brackets [ ] appears in the original patent but forms no part of this reissue specification; matter printed in italics indicates the additions made by reissue.

This invention relates to boilers and more particularly to steam boilers for domestic heating.

It is an object of the instant invention to expedite the generation of steam in boilers without materially increasing the fuel consumption.

A further object is to provide a steam boiler of simple and inexpensive design.

Other objects of the instant invention will become apparent in the course of the following specification.

In the attainment of these objectives, the boiler is formed with [three] vertically spaced water sections, the opposed surfaces of which are of wave form to provide [two] circuitous passageways for the products of combustion through the sections from a fire box which the sections rest. In each water section is a geyser fountain extending from the bottom upwardly above the water level and terminating in an outlet directed toward the wall of wave form. The heat generated in the fire box forces the heated water in the bottom of the sections upwardly through the fountains where the preheated water emerging with the steam from the fountain is quickly turned into steam on contact with the wave form surfaces forming the flue passageways. Means are provided in each section for maintaining the water lever uniform together with the usual indicators for operating and means for withdrawing the generated steam from each section and introducing water therein.

The invention will be more clearly understood when taken in conjunction with the accompanying drawings showing by way of example a preferred embodiment of the inventive idea.

Figure 1:
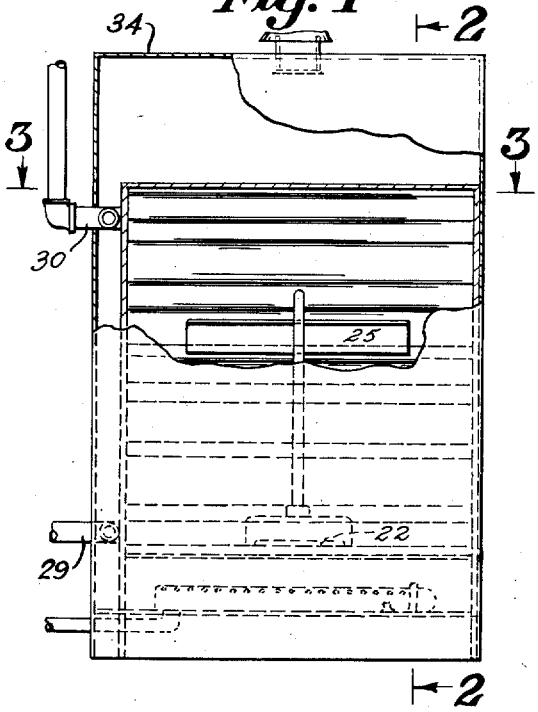
Figure 1 is a side elevational view of the steam boiler constructed in accordance with the principles of this invention with a portion of the cover broken away to more clearly show the internal construction.

Referring now in greater detail to the drawings where like reference numerals indicate like parts, reference numeral 10 indicates one of the outer water sections, 11 the other outer water section, and 12 the central water section.

Figure 3:
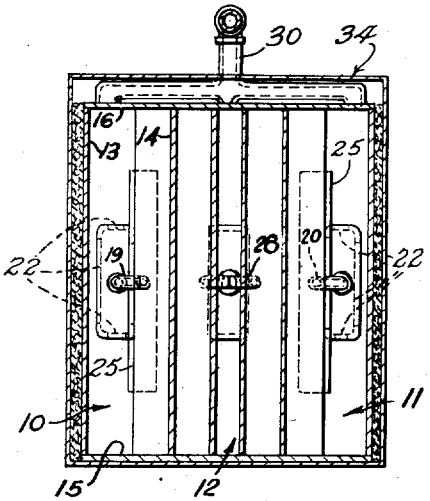
Figure 3 is a sectional view along 3—3 of Figure 1.
Figure 2:
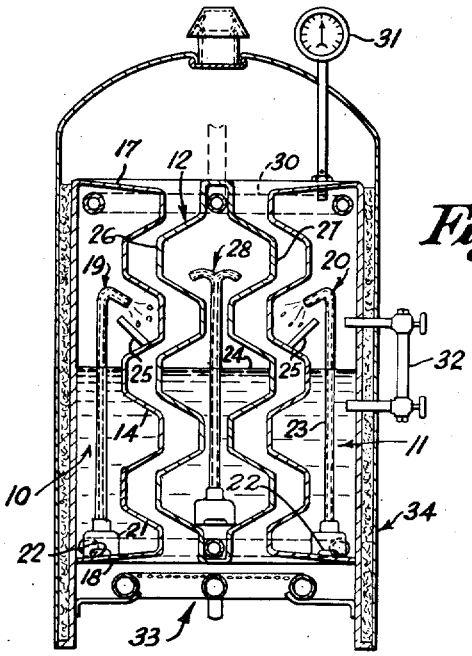
Figure 2 is a sectional view along 2—2 of Figure 1.

Each water section is a vertical water tight container of suitable heat resisting material and horizontally spaced apart, as most clearly shown in Figure 2. Each section has a cross-sectional form somewhat similar to that of a rectangle except for the opposed surfaces of wave-like form, described later. Each end section is constituted of the spaced parallel side members 13 and 14 (Fig. 3), spaced parallel front and back members 15 and 16, the top member 17 (Fig. 2) and the bottom member 18 attached in any suitable manner along corresponding edges. The front and back members may be common to all three sections with the side members welded in place.

The side member 14 has vertically spaced alternate projections and recesses for the length thereof, the cross-sectional form of which is that of a sine wave with flattened crests and troughs. It will be noted in Figure 2 that the crests and troughs of the surfaces of each section, that is, the surfaces that face each other are aligned.

In each of the outer sections 10 and 11 are the similar geyser fountains or thermo-siphonic means 19 and 20, respectively. Each geyser fountain is constituted of a hollow elongated base member 21 of rectangular cross section along the bottom edges of which are openings 22. Through the top of each base member 21 is a tube 23 extending above the water level 24 and terminating in an inwardly directed curved outlet directed toward a trough of a wave, as shown in Figure 2.

In each outer water section 10 and 11 and coacting with the outlets of the geyser fountains 19 and 20, respectively, is a dam 25 longitudinally disposed intermediate the trough and crest of consecutive waves over which the fountain outlets protrude. The dams extend substantially for the length of the sections and are positioned above the water level 24.

Intermediate the outer water sections 10 and 11 is the central water section 12 of similar construction to that of the outer sections except that both of the surfaces which face the outer sections have alternate horizontal projections and recesses of flattened sine wave formation. However, the wave formation of the spaced side members 26 and 27 of the central section 12 while aligned with each other have the wave crests aligned with the troughs of the outer sections and the troughs with the crests of the outer sections. It will be noted in Figure 2 that the troughs of the waves of the central section are constricted to form a substantially vertical passageway. By this arrangement two circuitous passageways are formed for the products of combustion between the fire box and the flue (not shown).

Within the central water section 12 is a geyser fountain or thermo-siphonic means 28 similar in all respects to the previously mentioned fountains 19 and 20 except that the head is of dual form, as illustrated, having one outlet directed in curvilinear form toward the interior of the trough of one wave on one side and the other outlet oppositely directed toward the interior of the trough of the aligned wave.

Any suitable system of inter-connecting pipes 29 having outlets in each of the three water sections and communicating with a common water supply may be used to maintain the water level in each section uniform while a similar pipe system 30 inter-connecting the tops of the water sections may be used for conducting the steam to the radiators. The steam pressure gauge 31 and water level gauge 32, both of known type, may be used also.

The vertically spaced water sections 10, 11, and 12 are supported by any known means above the fire box 33 which, as illustrated, is designed for gas but readily adapted to other types of fuel.

Around the water sections and fire box is the jacket 34 spaced from the water sections for the insertion of any suitable insulating material, as illustrated, and through which openings (not shown) may be provided for various servicing operations.

In operation, assuming that the boiler is filled to the level 24 shown in Figure 2 and the heat turned on, the water in the bottom of each section will be first heated and rise in the geyser fountains. The end fountains 19 and 20 direct the preheated combined steam and water against the troughs of the wave like walls of the passageways where the water is quickly converted into steam.

Excess water is caught by the dams 25 to be momentarily retained near the heated passageway for conversion into steam. In the same manner, heated water will rise in the central geyser fountain 28 and combined with steam will be forced outwardly against the inner surfaces of the aligned wave troughs, the excess water trickling downwardly over the sloping surfaces heated by the products of combustion to be turned quickly into steam or to absorb heat and mingle with the main body of water.

It will be understood that the invention is not limited to the exact disclosure herein described but may lend itself to a variety of expressions within the scope of the appended claims.

What is claimed is:

1. A steam boiler comprising a fire box, two outer and a central water section disposed above the fire box in spaced horizontal arrangement, the spaces between the sections communicating with the fire box and the opposed surfaces of the spaced sections being of wave form, the waves having crests and troughs in substantially horizontal arrangement and the crest and trough of each wave being flattened in substantially vertical planes, the flattened crests of the waves of the outer sections being aligned with each other and with the flattened troughs of the waves of the central section, the troughs of the waves of the central section further forming constricted passageways therebetween in substantially vertical alignment, means for enclosing the water sections and the fire box, and a geyser tube disposed in each section for directing the water from the bottom thereof against the inner surface of a crest of a wave in said section above the water level.

2. A steam boiler comprising a fire box, two outer and a central water section disposed above the fire box in spaced horizontal arrangement, the spaces between the sections communicating with the fire box and the opposed surfaces of the spaced sections being of wave form, each wave having a substantial amplitude with the crests and troughs of the waves in substantially horizontal arrangement and flattened in substantially vertical planes, the flattened crests of the waves of the outer sections further being aligned with each other and with the flattened troughs of the waves of the central section, the troughs of the central section forming vertically aligned and constricted passageways therebetween, and means for enclosing the water sections and the firebox; the boiler further comprising a geyser fountain for each section, the fountain for each outer section comprising a tube, one end of the tube communicating with the water at the bottom of the section, the free end of the tube being above the water level and directed toward the inner surface of the crest of a wave above the water level in the same section, a dam horizontally disposed [in] *within* said last mentioned [trough] *crest* and adapted to partially retain the water from the tube in the [trough] *crest,* the fountain for the central section comprising another tube, one end of said other tube communicating with the water at the bottom of the central section, the free end of said other tube being extended upwardly through the aligned passageways and bifurcating adjacent the free end extremity thereof into two outlets above the water level, each outlet being directed toward the inner surface of the crest of a wave of the central section above the water level.

*3. A steam boiler comprising a fire box, a plurality of water sections disposed above the fire box in spaced horizontal arrangement, the spaces between the sections communicating with the fire box and the opposed surfaces of the spaced sections being of substantially wave form with the crests of the wave of one section projecting into the troughs of the wave of another adjacent section, a separate geyser fountain for each section, each fountain comprising a tube, one end of the tube communicating with the water at the bottom of the section, the opposite end of the tube being above the water level and directed toward the inner surface of a crest of a wave above the water level in the same section, and a dam disposed within the last-mentioned crest and adapted to partially retain the water from the tube within that crest.*

References Cited in the file of this patent or the original patent

UNITED STATES PATENTS

| | | |
|---|---|---|
| 218,542 | Kremer | Aug. 12, 1879 |
| 399,975 | Cunningham | Mar. 19, 1889 |
| 822,607 | Hopler | June 5, 1906 |
| 1,164,803 | Freymark | Dec. 21, 1915 |
| 1,527,740 | Lipshitz | Feb. 24, 1925 |
| 1,664,914 | Boynton | Apr. 3, 1928 |
| 1,681,726 | Du Brie | Aug. 21, 1928 |
| 2,142,626 | Anderson et al. | Jan. 3, 1939 |
| 2,210,830 | Bernhard | Aug. 6, 1940 |
| 2,250,900 | Alexander | July 29, 1941 |
| 2,428,905 | Bilan | Oct. 14, 1947 |

FOREIGN PATENTS

| | | |
|---|---|---|
| 139,896 | Great Britain | Mar. 18, 1920 |